United States Patent
Lee

(10) Patent No.: US 11,074,123 B2
(45) Date of Patent: Jul. 27, 2021

(54) DEVICE FOR DETECTING ERROR OF DATA STORED IN MEMORY DEVICE, AND OPERATING METHOD THEREOF

(71) Applicant: SK hynix Inc., Gyeonggi-do (KR)

(72) Inventor: Dong-Sop Lee, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 78 days.

(21) Appl. No.: 16/521,286

(22) Filed: Jul. 24, 2019

(65) Prior Publication Data

US 2020/0201707 A1 Jun. 25, 2020

(30) Foreign Application Priority Data

Dec. 20, 2018 (KR) .................. 10-2018-0165746

(51) Int. Cl.
*G06F 11/10* (2006.01)
*G06F 3/06* (2006.01)

(52) U.S. Cl.
CPC ........ *G06F 11/1004* (2013.01); *G06F 3/0604* (2013.01); *G06F 3/0634* (2013.01); *G06F 3/0659* (2013.01); *G06F 3/0673* (2013.01)

(58) Field of Classification Search
CPC .............. G06F 11/073; G06F 11/0766; G06F 11/1004; G06F 11/1048; G06F 3/0604; G06F 3/0634; G06F 3/0659; G06F 3/0673; G11C 2029/0411; G11C 29/04; G11C 29/42
See application file for complete search history.

(56) References Cited

U.S. PATENT DOCUMENTS

| 6,560,725 B1* | 5/2003 | Longwell ............. G06F 11/073 711/105 |
| 10,628,248 B2* | 4/2020 | Chinnakkonda Vidyapoornachary ..................... G06F 11/073 |
| 2002/0018389 A1* | 2/2002 | Ito ......................... G06F 11/106 365/222 |
| 2009/0106505 A1* | 4/2009 | Rao ..................... G06F 11/1044 711/154 |
| 2009/0204752 A1* | 8/2009 | Sasaki ................... G11C 11/406 711/105 |
| 2009/0204852 A1* | 8/2009 | Diggs .................. G06F 11/008 714/42 |

(Continued)

FOREIGN PATENT DOCUMENTS

| KR | 10-0323536 | 5/2002 |
| KR | 10-2009-0050103 | 5/2009 |
| KR | 10-2017-0063319 | 6/2017 |

*Primary Examiner* — Albert Decady
*Assistant Examiner* — Enamul M Kabir
(74) *Attorney, Agent, or Firm* — IP & T Group LLP

(57) ABSTRACT

A device for detecting an error of data stored in a memory device includes an error detection trigger circuit configured to transmit an error detection trigger information for instructing an error detecting operation for at least a part of the data, at each first cycle, in the case where an error detection performing condition is satisfied; an error detection performing circuit configured to receive the error detection trigger information, instruct an error calculation engine to perform an error detecting operation for part or all of the data, and receive an error detection result information from the error calculation engine; and a reporting circuit configured to transmit reporting information depending on the error detection result information, to a target device.

19 Claims, 12 Drawing Sheets

(56) References Cited

U.S. PATENT DOCUMENTS

| | | | |
|---|---|---|---|
| 2012/0036411 A1* | 2/2012 | Ito | G06F 11/106 |
| | | | 714/754 |
| 2012/0203951 A1* | 8/2012 | Wood | G11C 16/28 |
| | | | 711/102 |
| 2012/0284590 A1* | 11/2012 | Ku | G06F 11/0772 |
| | | | 714/807 |
| 2013/0173970 A1* | 7/2013 | Kleveland | G11C 29/808 |
| | | | 714/710 |
| 2014/0059405 A1* | 2/2014 | Syu | G06F 11/1072 |
| | | | 714/773 |
| 2014/0211579 A1* | 7/2014 | Lovelace | G11C 11/40607 |
| | | | 365/200 |
| 2015/0278011 A1* | 10/2015 | Keppel | G06F 11/106 |
| | | | 714/754 |
| 2017/0060681 A1* | 3/2017 | Halbert | G06F 11/1068 |
| 2017/0153831 A1* | 6/2017 | Kim | G06F 3/0659 |
| 2020/0135293 A1* | 4/2020 | Raychaudhuri | G06F 9/542 |

* cited by examiner

DEVICE FOR DETECTING ERROR OF DATA STORED IN MEMORY DEVICE, AND OPERATING METHOD THEREOF

CROSS-REFERENCE TO RELATED APPLICATION

The present application claims priority to Korean Patent Application No. 10-2018-0165746, filed in the Korean Intellectual Property Office on Dec. 20, 2018, which is incorporated herein by reference in its entirety.

BACKGROUND

1. Technical Field

Various embodiments generally relate to a device for detecting an error of data stored in a memory device, and an operating method thereof.

2. Related Art

A storage device stores data based on a request of a host such as a computer and a smartphone. The storage device may store data in a magnetic disk, such as a hard disk drive (HDD), or store data in a nonvolatile memory, such as a solid state drive (SDD), a UFS (universal flash storage) device or an eMMC (embedded MMC) device.

Examples of a nonvolatile memory include a ROM (read only memory), a PROM (programmable ROM), an EPROM (electrically programmable ROM), an EEPROM (electrically erasable and programmable ROM), a flash memory, a PRAM (phase-change RAM), an MRAM (magnetic RAM), an RRAM (resistive RAM), and an FRAM (ferroelectric RAM).

The storage device may include an SoC (system-on-chip) and firmware (FW) therein, to perform read and write operations for the nonvolatile memory according to a request of the host.

When the firmware in the storage device is driven, the program code and data of the firmware are stored in a volatile memory in the storage device. As such, the volatile memory loses data stored therein when power supply is interrupted. The volatile memory may be an SRAM (static RAM), a DRAM (dynamic RAM) or an SDRAM (synchronous DRAM).

SUMMARY

Various embodiments are directed to a storage device which detects an error occurred in data stored in a memory device, as quickly as possible, regardless of whether the data stored in the memory device is accessed or not, thereby increasing operational safety, and an operating method thereof.

In an embodiment, a device for detecting an error of data stored in a memory device may include: an error detection trigger circuit configured to transmit an error detection trigger information for instructing an error detecting operation for at least a part of the data, at each first cycle, in the case where an error detection performing condition is satisfied; an error detection performing circuit configured to receive the error detection trigger information, instruct an error calculation engine to perform error detecting operation for a part or all of the data, and receive an error detection result information from the error calculation engine; and a reporting circuit configured to transmit reporting information depending on the error detection result information, to a target device.

In an embodiment, a method for detecting an error of data stored in a memory device may include: generating an error detection trigger information for instructing an error detecting operation for at least a part of the data, at each first cycle, in the case where an error detection performing condition is satisfied; receiving the error detection trigger information, and performing the error detecting operation; and transmitting reporting information depending on an error detection result information for the error detecting operation, to a target device.

In an embodiment, a memory system may include: a memory device configured to store data; an error detection circuit configured to perform an error detection operation on at least part of the data; and a processor configured to control the error detection circuit to perform the error detection operation and to report a result of the error detection operation to a host, wherein the processor controls the error detection circuit to perform the error detection operation in response to a compulsory error detection command, and wherein the processor controls the error detection circuit to further perform the error detection operation at each detection cycle varying with respect to a default cycle according to a state of the memory device.

Embodiments of the disclosure provide a storage device which detects an error occurred in data stored in a memory device, as quickly as possible, regardless of whether the data stored in the memory device is accessed or not, thereby increasing operational safety, and an operating method thereof.

DETAILED DESCRIPTION

Figure 1:
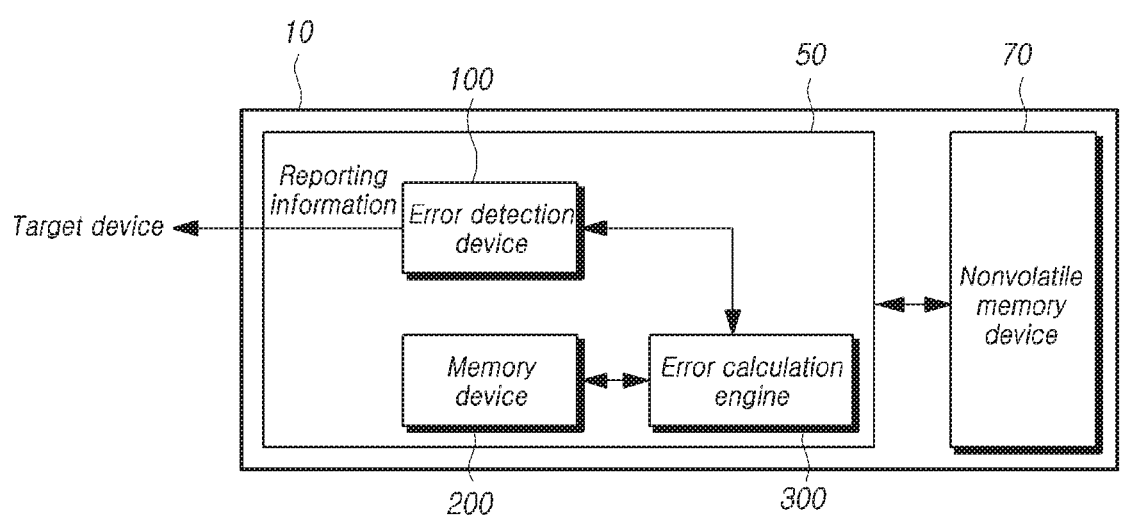
FIG. 1 is a diagram illustrating a storage device in accordance with an embodiment of the disclosure.

In the disclosure, advantages, features of the invention and methods for achieving them will become more apparent after a reading of the following embodiments taken in conjunction with the accompanying drawings. The invention may, however, be embodied in different forms and should not be construed as being limited to the embodiments set forth herein. Rather, these embodiments are provided to describe the disclosure in detail to the extent that a person skilled in the art to which the disclosure pertains can practice the invention. Throughout the specification, reference to "an embodiment," "another embodiment" or the like is not necessarily to only one embodiment, and different references to any such phrase are not necessarily to the same embodiment(s).

It is to be understood herein that embodiments of the disclosure are not limited to the particulars shown in the drawings and that the drawings are not necessarily to scale and in some instances proportions may have been exaggerated in order to more clearly depict certain features of the disclosure. Like reference numerals denote like elements throughout the drawings and the description.

While particular terminology is used herein, it is to be appreciated that the terminology used herein is for the purpose of describing particular embodiments only and is not intended to limit the scope of the invention.

Specific structural and functional description herein is directed to embodiments of the disclosure. However, these embodiments may be implemented in various ways and forms; thus the invention is not limited to the embodiments described herein. Rather, the invention encompasses all changes, equivalents and modifications within the spirit and scope of the disclosure.

As used herein, the term "and/or" includes any and all combinations of one or more of the associated listed items. The terms such as "first" and "second" may be used to identify various components, but those components should not be limited by the terms. The terms are merely used to distinguish one component from other components that have the same or similar names. For example, a first component in one instance may be designated as a second component in another instance without departing from the scope based on the concept of the disclosure.

It will be understood that, when an element is referred to as being "connected" or "coupled" to another element, it can be directly connected or coupled to the other element or one or more intervening elements may be present. In contrast, when an element is referred to as being "directly connected" or "directly coupled" to another element, there are no intervening elements present. Other representations describing relationships among components, that is, "between" and "directly between" or "adjacent to," and "directly adjacent to," should be interpreted in similar ways.

A singular expression includes a plural expression unless the context indicates otherwise. In the present specification, it should be understood that the terms such as "include" or "have" indicate that features, numbers, steps, operations, components, parts, or combinations thereof are present, but do not exclude the possibility that one or more other features, numbers, steps, operations, components, parts, or combinations thereof are present or added.

Unless differently defined, all terms used herein, including technical or scientific terms, have the same meanings as the terms generally understood by those skilled in the art to which the disclosure pertains. The terms defined in generally used dictionaries should be interpreted as having meanings consistent with their use in the related art, and not be interpreted in an ideal or excessively formal way, unless so defined herein.

Detailed description of well-known functions and structures may be omitted to avoid obscuring the subject matter of the disclosure. This aims to make the subject matter of the disclosure clearer.

Also, in describing the components of the disclosure, there may be terms used like first, second, A, B, (a), and (b). These are solely for the purpose of differentiating one component from the other but not to imply or suggest the substances, order or sequence of the components. If a component is described as "connected," "coupled" or "linked" to another component, it may mean that the component is directly "connected," "coupled" or "linked" or is indirectly "connected," "coupled" or "linked" via a third component.

As described above, a storage device such as an SSD, a UFS device and an eMMC device performs read and write operations for a nonvolatile memory device depending on the contents of a command which is defined by a protocol, in response to a request of a host.

As the Technode of an SoC has become smaller, especially application specific integrated circuit (ASIC) technology which has shrunk from 28 nm to 16 nm or less, the cell density of a memory device such as an SRAM and a DRAM has increased gradually. Also, in order to meet higher requirements, a storage device needs to perform more diverse and complex operations at high speed.

On the other hand, the environmental constraints for a system to which a storage device is mounted are continuously increasing. For example, the size and refresh rate of a liquid crystal display (LCD) are continuously increasing, and a data rate required for communication schemes such as WiFi and LTE is continuously increasing as well.

Thus, in order for the storage device to be tolerant of the power noise generated by other devices of such a system, expensive printed circuit board (PCB) and parts are needed, and this may lead to a rise in the overall BOM (bills of materials).

By such external factors, a bit flip may occur intermittently for data stored in the memory device such as an SRAM and a DRAM on the storage device. In this way, if an unexpected error (e.g., a bit flip due to the presence of alpha particles) occurs for data stored in the memory device such as an SRAM and a DRAM, a problem may be caused in that the storage device may operate abnormally.

In addition to the bit flip problem, the system environment may gradually become worse, which leads to a high possibility that a memory device having higher performance and capacity is likely to function abnormally. Further, a risk over cost and design verification caused to overcome this situation is also increasing steadily.

On the other hand, operating temperature, voltage level, low power design and the environment of a main board are also exacerbating the problems described above. In automobiles as well as mobile devices, this problem has become an important issue. Therefore, there is a need for to solve these problems with appropriate effort and cost and to satisfy related requirements.

Embodiments described in the disclosure explain a method for coping with a soft error due to a bit flip or the like in the case of using a large-capacity memory device such as an SRAM and a DRAM in a storage device.

Conventional methods for coping with a soft error occurring in a memory device may be generally divided into three schemes.

1) No Protection

Screening is performed as much as possible in the ASIC and package processes and an acceptable ASIC die is obtained and applied to a system, but no additional mechanism for detecting/correcting a soft error is used.

2) Overkill Protection

An overkill protection scheme is a scheme in which an EDC (error detection code)/ECC (error correction code) parity is applied to a minimum write unit. For example, in the case where a minimum write unit is 32 bits, a 1-bit EDC parity or a 7-bit ECC parity may be applied.

3) Compromised Protection

In a compromised protection scheme one large protection unit is formed by grouping a plurality of write units, and an EDC/ECC parity is applied to protection unit. For example, an EDC/ECC parity is configured for data of protection units of 128 bytes, 256 bytes or 512 bytes.

In comparing the above-described three schemes, the no protection scheme has a problem in that overhead exists due to ASIC screening, system cost increases due to packaging, and the no protection scheme is vulnerable to an unexpected occurrence of a bit flip.

The overkill protection scheme has a problem in that, because the overhead of a parity is added to each write unit, that overhead is excessively large compared to data. For example, in the case of using a 1-bit EDC parity per 32-bit write unit, there is an overhead of $1/32 \approx 3\%$, and, in the case of using a 7-bit ECC parity, there is an overhead of $(7/32) \approx 17\%$.

Lastly, the compromised protection scheme has an advantage over the overkill protection scheme in that it is possible to significantly reduce the overhead of a parity compared to data. For example, a 1-bit parity per 128 bits or a 2-byte (=16 bits) parity per 256 bytes may be used, and in either case, the parity overhead may be less than 1% compared to data.

However, the compromised protection scheme is disadvantageous in terms of latency compared to the overkill protection scheme. This is because, in the case where one protection unit is configured by grouping a plurality of write units, even when a change occurs only in a portion of the protection unit, a parity needs to be calculated by reading data of the entire protection unit.

In the case of using any of the above-described three schemes for coping with a soft error, a soft error is not recognized when the soft error occurs but at a later time when the corresponding data is accessed.

For example, in the case of using the no protection scheme, it is possible to recognize that a soft error has occurred in data stored in the memory device when a system fails or malfunctions. In the case of using the overkill protection scheme or the compromised protection scheme, it is possible to recognize that a soft error has occurred, when data in which the soft error has occurred is accessed.

If the time interval from when a soft error first occurs to when the occurrence of the soft error is recognized is long, the possibility of more bit errors occurring and accumulating increases. Therefore, the probability that the number of a bits experiencing soft error exceeds the number of correctable error bits increases.

For example, if a 1-bit soft error is recognized immediately when it first occurs, the error may be corrected through a 1-bit ECC, and there is no need to additionally process the error.

However, if significant time passes such that another 1-bit soft error occurs before the first 1-bit soft error is recognized in the data, a problem is caused in that there are now two error bits, which cannot be corrected with a 1-bit ECC. Thus, additional error processing is necessary.

In particular, a device which supports a low power mode, such as a mobile device, employs a scheme in which the memory device is caused to enter a retention state, that is, a state in which the memory device does not perform a read/write operation and stored data is retained not to be lost, and power supply to the other devices is interrupted. The retention state may also be referred to as a sleep state, and its meaning is not limited by its name.

In this way, a soft error may occur even in the case where the memory device remains in the retention state for a long time. If a soft error occurs, after the memory device wakes up from the retention state and enters an active state, that is, a state in which it may perform a read/write operation, it is possible to recognize the occurrence of the soft error in the case where a read/write operation is performed for data in which the soft error has occurred.

Therefore, in an embodiment of the disclosure, description is presented for an error detection device which performs error detection for data stored in a memory device, based on a cycle determined by a background operation or an event by a firmware (FW), with an aim of detecting a soft error occurred in the data stored in the memory device as quickly as possible.

Such error detection device may perform an EDC or ECC operation for the corresponding data, regardless of whether the corresponding data is accessed or not.

If the EDC operation is performed for data, it is possible to detect the occurrence of an error in the corresponding data. If the ECC operation is performed for data, it is possible to correct errors within the ECC capability of the error detection device.

In the case where the EDC operation is performed, the error detection device may immediately report the soft error to a target device so as to prevent additional occurrence of a soft error.

In the case where the ECC operation is performed, when the number of bits in which a soft error occurred is equal to or lower than a correctable error bit number T, the error detection device may correct the error and retain data. Conversely, when the number of bits in which a soft error occurred exceeds T, the error detection device may immediately report the soft error to the target device to prevent additional occurrence of a soft error.

Through the EDC/ECC operation described above, the error detection device may maintain the integrity of data stored in the memory device, and the operation of detecting an error may be referred to as an operation of maintaining integrity of data.

The error detecting operation may be referred to as a scrubbing operation for a memory device.

Embodiments of the disclosure are based on the premise that the overkill protection scheme or the compromised protection scheme described above is basically applied to data stored in a memory device, so that the EDC/ECC operation described above may be performed.

Various embodiments are described below in detail, with reference to the accompanying drawings, to explain the invention to the extent that a person skilled in the art to which the disclosure pertains can practice the invention.

FIG. 1 is a diagram illustrating a storage device in accordance with an embodiment of the disclosure.

Referring to FIG. 1, a storage device 10 may include a controller 50 and a nonvolatile memory device 70.

The controller 50 may receive a request from a host, may control the nonvolatile memory device 70 based on the received request, and may transmit a response to the host, if necessary.

The nonvolatile memory device 70 may store data. The nonvolatile memory device 70 operates under the control of the controller 50.

The nonvolatile memory device 70 may include a memory cell array which includes a plurality of memory cells. In an embodiment, the nonvolatile memory device 70 may be a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM) or a spin transfer torque random access memory (STT-RAM).

In an embodiment, the nonvolatile memory device 70 may be realized as a three-dimensional array structure. The disclosure may be applied not only to a flash memory device in which a charge storage layer is configured by a conductive floating gate (FG) but also to a charge trap flash (CTF) in which a charge storage layer is configured by a dielectric layer.

The nonvolatile memory device 70 is configured to receive a command and an address from the controller 50 and access a region selected by the address in the memory cell array. In other words, the nonvolatile memory device 70 may perform an operation corresponding to the command, for the region selected by the address.

For example, the nonvolatile memory device 70 may perform a program operation, a read operation and an erase operation. In the program operation, the nonvolatile memory device 70 may program data to the region selected by the address. In the read operation, the nonvolatile memory device 70 may read data from the region selected by the address. In the erase operation, the nonvolatile memory device 70 may erase data stored in the region selected by the address.

The host may include at least one operating system. The operating system may generally manage and control the function and operation of the host, and may provide inter-operations between the storage device 10 and the host. The host may be an electronic device, for example, any of various wired/wireless electronic devices, such as a mobile phone, an MP3 player, a laptop computer, a desktop computer, a game machine, a TV or a projector.

A memory device 200 may store data as a target for error detection, and may be a volatile memory such as an SRAM or a DRAM. The memory device 200 may receive a data read/write request through a bus interface which is coupled with a bus on the controller 50.

On the other hand, as described above, since the disclosure is based on the premise that the overkill protection scheme or the compromised protection scheme described above is applied to data stored in the memory device 200, not only data but also a parity for the data may be stored in the memory device 200. An error calculation engine or EDC/ECC engine 300 uses a parity for data, to calculate an error for the data.

An error detection device 100 may request the error calculation engine 300 to perform a calculation for an error detecting operation for the data stored in the memory device 200.

The error calculation engine 300 may perform the error detecting operation, that is, an EDC operation or an ECC operation for the data stored in the memory device 200. The error calculation engine 300 may include an EDC engine or an ECC engine for performing the EDC operation or the ECC operation.

After performing the error detecting operation, the error calculation engine 300 may transfer error detection result information to the error detection device 100. The error detection result information may include information on whether or not an error has occurred or the number of bits in which errors have occurred.

In the case where the error calculation engine 300 corrects an error of data by performing the ECC operation, the error calculation engine 300 may store corrected data in the memory device 200.

The error detection device 100 may generate reporting information based on the error detection result information received from the error calculation engine 300, and may transmit the configured reporting information to a target device.

The reporting information may include one or more of information on whether an error has occurred or not, information on an address where an error has occurred and information on whether the number of soft error bits is less than or equal to a limit representing the maximum number of soft error bits that are correctable.

The target device, which receives the reporting information, may be, for example, the above-described host (e.g., any of various wired/wireless electronic devices, such as a mobile phone, an MP3 player, a laptop computer, a desktop computer, a game machine, a TV and a projector), a controller which controls the memory device 200, or an SSD system or a user system in which the memory device 200 is mounted.

The target device may receive the reporting information from the error detection device 100, and may perform an operation according to the received reporting information.

For instance, in the case where information that the number of soft error bits is less than or equal to a correctable limit is indicated by the reporting information, the target device may record a log that an error has occurred.

For another instance, in the case where the number of soft error bits is greater than the correctable limit and a normal operation of the storage device 10 is no longer possible, the target device may initialize all data stored in the memory device 200 or reset the storage device 10.

Further details of the error detection device 100 are given below with reference to FIGS. 2 to 4.

Figure 2:
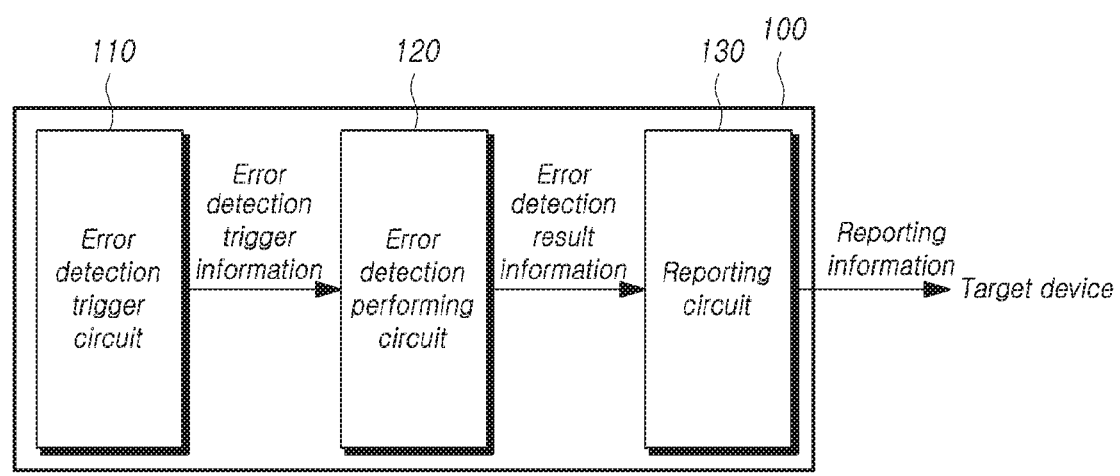
FIG. 2 is a diagram illustrating a configuration of an error detection device, such as that of FIG. 1.

FIG. 2 is a diagram of an exemplary configuration of the error detection device 100 of FIG. 1.

Referring to FIG. 2, the error detection device 100 may include an error detection trigger circuit 110, an error detection performing circuit 120 and a reporting circuit 130.

The error detection trigger circuit 110 may transmit error detection trigger information for instructing an error detecting operation for at least a part of data, to the error detection performing circuit 120 at each first cycle, in the case where an error detection performing condition is satisfied.

The error detection trigger information may be generated at each first cycle that is set based on setting information for detecting an error of the data or state information representing a state of the memory device 200. The error detection trigger information may also be transferred to another module in the form of a tick.

Whether an error detection performing condition is satisfied or not may be determined as in the examples described below.

For instance, the error detection trigger circuit 110 may determine that an error detection performing condition is satisfied, in the case where a mode of the memory device 200 changes from a retention mode to an active mode. This is because, if a long time elapses with the memory device 200 being in the retention mode, there is a possibility that an error may occur in data stored in the memory device 200, due to a bit flip or the like.

For another instance, the error detection trigger circuit 110 may determine that an error detection performing condition is satisfied, in the case where the memory device 200 enters the retention mode or in the case where a set time elapses after the memory device 200 enters the retention mode.

For still another instance, the error detection trigger circuit 110 may determine that an error detection performing condition is satisfied, at each interval, in the case where the memory device 200 is in the retention mode. The interval is a set time period that defines a cycle at which the error detecting operation is performed for a part or all of data.

The reason why it is determined that an error detection performing condition is satisfied at each interval when the memory device 200 is the retention mode is as follows. If an error is detected only when the memory device 200 changes from the retention mode to the active mode, a problem is caused in that an error, which has occurred while the memory device 200 is in the retention mode, is sensed when the retention mode ends.

In this case, in order to perform the error detecting operation for a part or all of the data stored in the memory device 200, the memory device 200 wakes up from the retention mode at each interval and enters the active mode, and when the error detecting operation for a part or all of the data is completed, the memory device 200 is returns to the retention mode.

For yet still another instance, the error detection trigger circuit 110 may determine that an error detection performing condition is satisfied, in the case where a compulsory error detection command is set in the setting information. In this case, it is determined that an error detection performing condition is satisfied, regardless of whether the memory device 200 has entered the retention mode or not.

A specific example in which the error detection trigger circuit 110 generates the error detection trigger information will be described with reference to FIG. 3.

The error detection performing circuit 120 may receive the error detection trigger information generated in the error detection trigger circuit 110, and may instruct the error calculation engine 300 to perform the error detecting operation for all or a part of data and transfer an error detection result information to the reporting circuit 130.

A specific example in which an error detecting operation is instructed and performed for at least a part of data is described with reference to FIG. 4.

The reporting circuit 130 may transmit reporting information according to the error detection result information to a target device. The error detection result information may be transferred from the error detection performing circuit 120.

The reporting information may include one or more of information on whether an error has occurred or not, information on an address where an error has occurred and information on whether the number of error bits is less than or equal to the maximum number of error bits that are correctable. As described above with reference to FIG. 1, the target device, which receives the reporting information, may be, for example, the above-described host (e.g., any of various wired/wireless electronic devices such as a mobile phone, an MP3 player, a laptop computer, a desktop computer, a game machine, a TV and a projector), a controller which controls the memory device 200, or a memory card system or a user system in which the memory device 200 is mounted.

Figure 3:
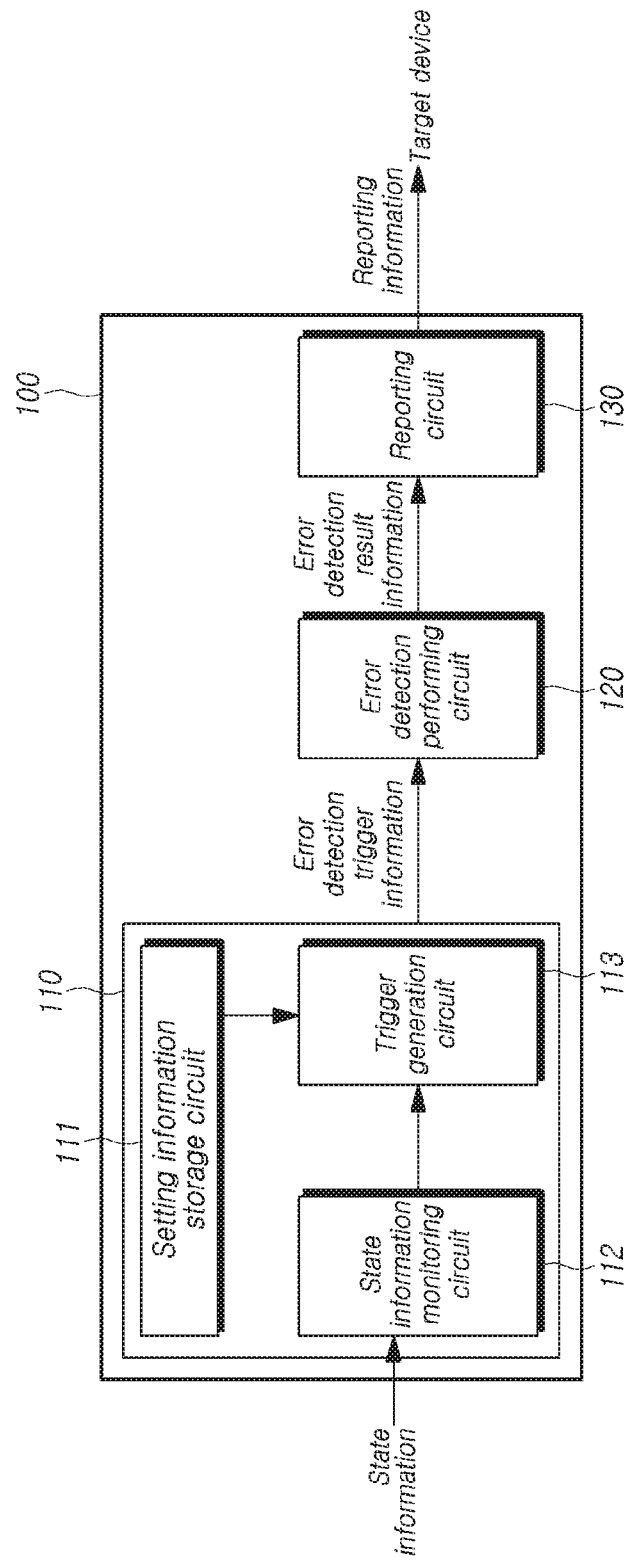
FIG. 3 is a diagram illustrating an exemplary configuration of an error detection device, such as that of FIG. 2.

FIG. 3 is a diagram illustrating an exemplary configuration of the error detection device 100 of FIG. 2.

Referring to FIG. 3, the error detection trigger circuit 110 may include a setting information storage circuit 111, a state information monitoring circuit 112 and a trigger generation circuit 113.

The setting information storage circuit 111 may store setting information for detecting an error of data. The setting information may include information to control an error detecting operation for data.

For example, the setting information may be generated by firmware which drives a controller to which the error detection device 100 and the memory device 200 are mounted. For another example, the setting information may be generated by an external host device.

The following information may be included in the setting information. For instance, information on an interval that defines a cycle at which an error detecting operation for a part or all of data is performed in the retention mode of the memory device 200 may be included in the setting information. For another instance, the number of times which error detection is performed may be included in the setting information. For still another instance, information on a scheme in which reporting information is transmitted may be included in the setting information.

The state information monitoring circuit 112 may monitor a state of the memory device 200 in which data is stored.

The state information monitored in the state information monitoring circuit 112 may include one or more of i) a process variable, ii) temperature information, iii) voltage information and iv) access frequency information for the memory device 200.

The process variable is for a process in connection with manufacturing the memory device 200, and defines a characteristic or property of the processing. The process variable may be determined based on process deviation information on the memory device 200, and may be fused at the time of mass production.

The process deviation information on the memory device 200 may be expressed as SS (slow slow), SF (slow fast), FS (fast slow), FF (fast fast) and TT (typical typical) as process corner values.

With respect to a PMOS/NMOS transistor configuring a memory cell in the memory device 200, there is a case where the PMOS transistor is fast/typical/slow, and there is a case where the NMOS transistor is fast/typical/slow. Depending on the characteristic of the PMOS/NMOS transistor configuring a memory cell, the operating speed of the memory cell may be determined differently. Depending on the characteristics of cells at a processing step where the memory device 200 is mass-produced, the process corner value may be determined.

The temperature information means the value of ambient temperature of the memory device 200. In general, as an ambient temperature rises, the possibility of an error occurring in data stored in the memory device 200 increases. Conversely, as an ambient temperature falls and approaches a normal temperature (or a room temperature), the possibility of an error occurring in data stored in the memory device 200 decreases.

The voltage information means the value of a voltage supplied to the memory device 200. In the case where a voltage equal to or higher than a set rated voltage is supplied, the possibility of an error occurring in data stored in the memory device 200 is low. However, in the case where an abnormality occurs in a power supply for supplying power or a supplied voltage becomes low as a plurality of devices simultaneously use power, the possibility of an error occurring in data stored in the memory device 200 increases.

Not only in the case where the memory device 200 is an active mode but also in the case where the memory device 200 enters a retention mode and does not actually perform a read/write operation, the temperature information and the voltage information may vary by an external factor.

Finally, the access frequency information for the memory device 200 means the number of times which a read/write operation is performed for the memory device 200. Generally, as a read/write operation for the memory device 200 is performed more frequently, temperature rises due to heat generation in a circuit inside the memory device 200, and a supplied voltage decreases due to power consumption of the memory device 200. Thus, it may be determined that the possibility of an error occurring in data stored in the memory device 200 increases as a read/write operation for the memory device 200 is performed more frequently.

The trigger generation circuit 113 may transmit error detection trigger information for instructing an error detecting operation for all or a part of data stored in the memory device 200, to the error detection performing circuit 120, based on the above-described setting information or state information.

The error detection trigger information may be transmitted to the error detection performing circuit 120 at each first cycle that is set based on the above-described setting information or state information. The error detection trigger information may be transferred to another module in the form of a tick information.

As an example in which the trigger generation circuit 113 generates the error detection trigger information based on the above-described setting information or state information, the error detection trigger information may be generated based on a warning level information which is set by the state information monitoring circuit 112 based on the above-described state information. The warning level information may be defined as a preset level value.

For example, the warning level information may be expressed by the value of 3 bits, and each value may be represented as −3, −2, −1, 0, 1, 2 or 3. It may be set such that the larger the value of a warning level is, the shorter the first cycle at which the error detecting operation is performed.

The warning level information 0 may be set as a default value. A setting may be made such that an error detection frequency increases as the value of the warning level information increases to 1, 2 and 3 and decreases as the value of the warning level information decreases to −1, −2 and −3. A setting may be made such that, if a warning level is 3 as a maximum value, error detection is performed with a preset maximum frequency, and, if a warning level is −3 as a minimum value, error detection is not performed.

On the other hand, the priority of each state information used in setting the warning level information may be applied differentially.

The priorities of the temperature information and the voltage information may be higher than the priority of the process variable. In this case, instead of using the value of the process variable alone to determine the warning level information, the state information monitoring circuit 112 may use the value of the process variable as a factor that determines the warning level information, in the case where the possibility of an error occurring increases as the temperature information is equal to or higher than a threshold temperature or the voltage information is equal to or lower than a threshold voltage.

Namely, in the case where the temperature information is equal to or higher than the threshold temperature or the voltage information is equal to or lower than the threshold voltage, the state information monitoring circuit 112 may increase the value of the warning level information by referring to the process variable. In the case where the temperature information is lower than the threshold temperature or the voltage information exceeds the threshold voltage, the state information monitoring circuit 112 may decrease the value of the warning level information by referring to the process variable.

For example, in the memory device 200, memory cells having the FF characteristic may have a high possibility to operate normally without occurrence of an error in stored data even though a supplied voltage is low. Conversely, memory cells having the SS characteristic may have a high possibility of an error in stored data as a supplied voltage is low. Therefore, in the case where a supplied voltage is low, whether to further increase the warning level information may be determined depending on the value of the process variable.

The first cycle may be determined based on the warning level information received from the state information monitoring circuit 112 and the above-described interval defining a cycle at which the error detecting operation is performed for a part or all of data in the retention mode of the memory device 200.

The first cycle may be determined differently depending on error detection completion time information included in the above-described setting information, the warning level information received from the state information monitoring circuit 112 and the size of unit data as a target of the error detecting operation to be performed at each first cycle.

Below, an example in which the first cycle is determined is described.

First, it is assumed that the error detection completion time information instructing that error detection for data stored in the memory device 200 be completed at each 64 ms is set in the setting information.

The error detection completion time may be set within the above-described interval. This is because, if the error detection completion time is larger than the interval, a problem may be caused in that, while the error detecting operation is performed as the memory device 200 is changed from the retention mode to the active mode, the error detecting operation is started again.

Further, it is assumed that data stored in the memory device 200 is represented by total 64K number of unit data and each unit data configures one EDC/ECC protection unit. In this case, the trigger generation circuit 113 may generate the error detection trigger information at each 64 ms/64K=1 us.

The first cycle at which the error detection trigger information is generated may be additionally changed depending on the warning level information determined in the state information monitoring circuit 112.

In the above-described example, it is assumed that, when the value of the warning level information is basically 0, the error detection trigger information is generated at each 1 us.

In the case where a voltage supplied to the memory device 200 decreases (e.g., 5% drop) and the value of the warning level information becomes +1, a cycle at which the error detection trigger information is generated may be determined as 0.9 us, i.e., shorter than 1 us, so that error detection may be performed more quickly.

In the case where a voltage supplied to the memory device 200 increases and the value of the warning level information becomes −1, a cycle at which the error detection trigger information is generated may be determined as 1.1 us, e.g., longer than 1 us, so that error detection may be performed more slowly.

Figure 4:
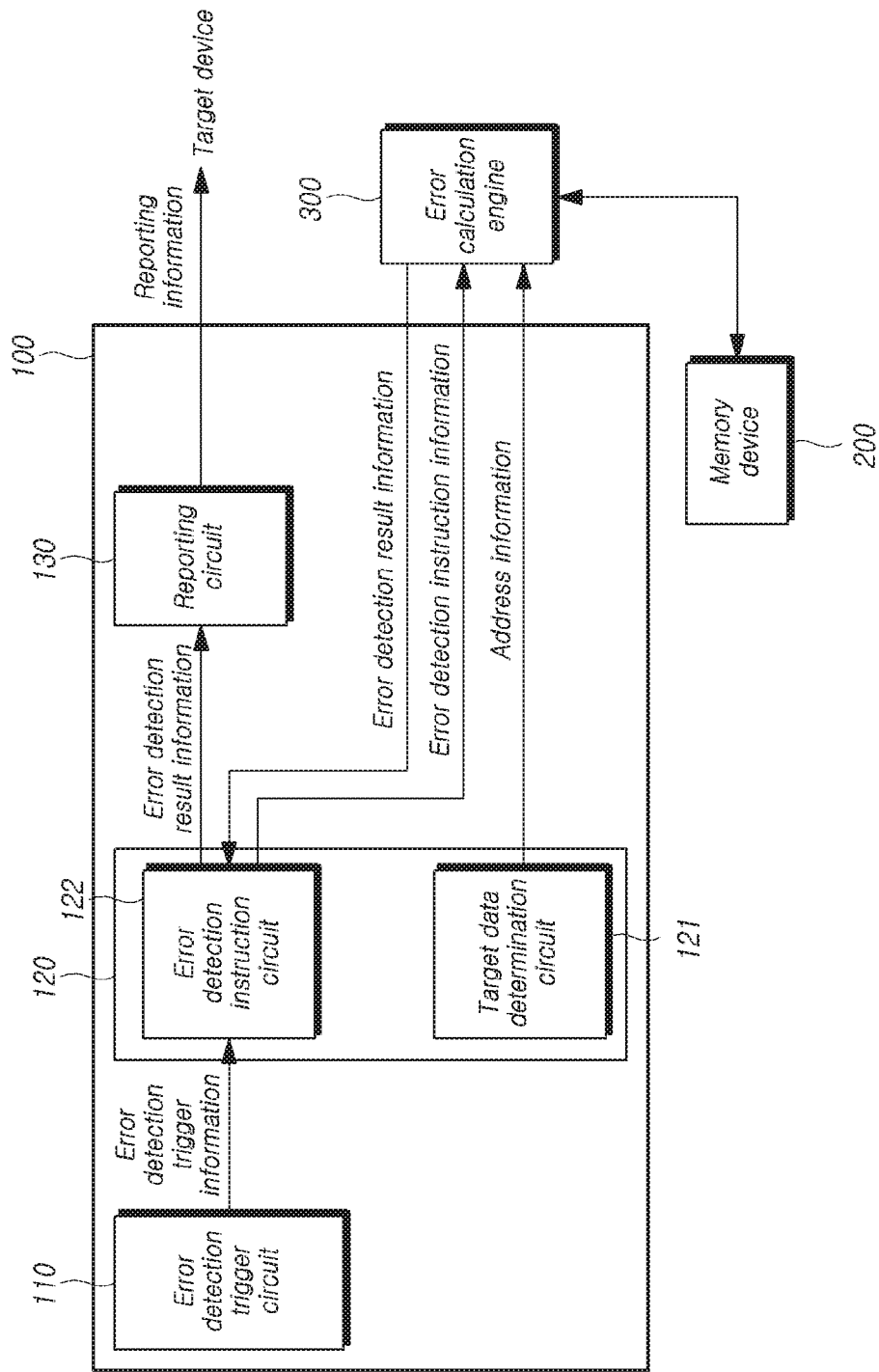
FIG. 4 is a diagram illustrating another exemplary configuration of an error detection device, such as that of FIG. 2.

FIG. 4 is a diagram illustrating another example of a configuration of the error detection device 100 of FIG. 2.

Referring to FIG. 4, the error detection performing circuit 120 may include a target data determination circuit 121 and an error detection instruction circuit 122.

The target data determination circuit 121 may select target data for the error detecting operation, at a data error detection time that is determined in the error detection trigger circuit 110.

The target data means unit data selected as a target of the error detecting operation at each first cycle at which the error detection trigger information is generated. The target data may be all or a part of data stored in the memory device 200.

If the error detecting operation is performed at one time on the entirety of the data stored in the memory device 200, the size of data to be calculated at a time by the error calculation engine 300 needs to be increased. In this case, since the complexity of a circuit which configures the error calculation engine 300 increases, a problem may be caused in terms of the size and cost of the error calculation engine 300.

The data stored in the memory device 200 may be divided into a plurality of EDC/ECC protection units, and error detection may be performed for each EDC/ECC protection unit.

Therefore, at each first cycle at which the error detection trigger information is generated, the error detecting operation may be performed only for the target data selected as a target for the error detecting operation, among the entire data stored in the memory device 200. Such target data may be configured by at least one EDC/ECC protection unit.

With respect to a sequence among target data that is determined at each first cycle at which the error detection trigger information is generated, the target data may be sequentially selected or may be randomly selected, among the entire data.

For instance, it is assumed that the data stored in the memory device 200 is represented by total 64K number of unit data and each unit data configures one EDC/ECC protection unit. In this case, target data may be sequentially selected from unit data of a smallest address value to unit data of a largest address value, based on the address values of the respective unit data.

On the other hand, target data may be selected in a random order among the total 64K number of unit data. However, in this case, it is necessary to manage such that target data which is selected once is not selected again so that the error detecting operation may be performed once for the entirety of the data stored in the memory device 200.

Upon receipt of the error detection trigger information generated by the error detection trigger circuit 110, the error detection instruction circuit 122 may instruct the external error calculation engine 300 to perform an error detecting operation for the target data.

The error calculation engine 300 may receive the error detection instruction information from the error detection instruction circuit 122, and may receive an address information on the target data and perform the error detecting operation for the target data. The error calculation engine 300 may transmit an error detection result information on the target data as a result of the error detecting operation, to the error detection instruction circuit 122.

The error detection instruction circuit 122 may receive the error detection result information from the error calculation engine 300.

Figure 5:
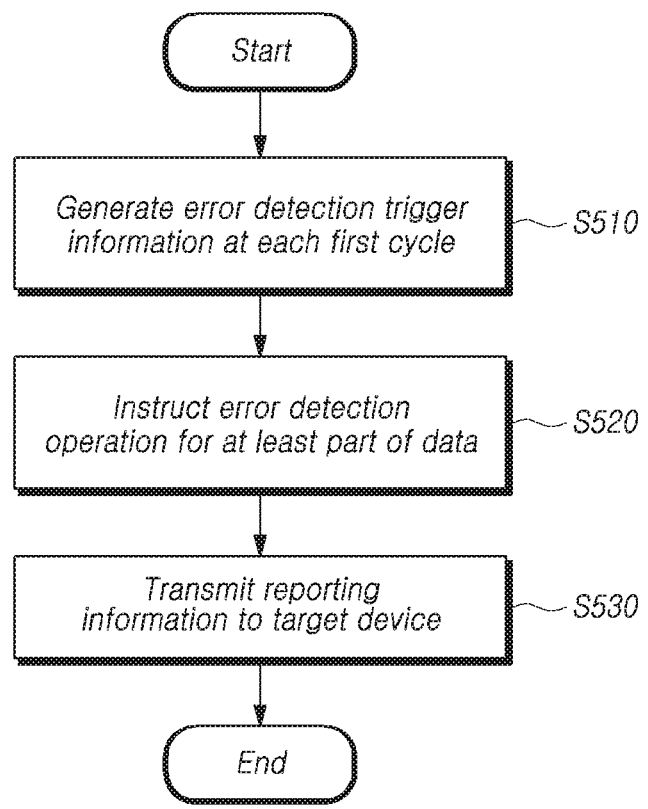
FIG. 5 is a flow chart illustrating an operation of an error detection device in accordance with an embodiment of the disclosure.

FIG. 5 is a flow chart illustrating an operation of the error detection device 100 in accordance with an embodiment of the disclosure.

The present operation may be performed by the error detection device 100 described above with reference to FIG. 2.

Referring to FIG. 5, the error detection trigger circuit 110 of the error detection device 100 may generate an error detection trigger information for instructing an error detecting operation for at least a part of data, at each first cycle, in the case where an error detection performing condition is satisfied (S510).

The error detection performing circuit 120 of the error detection device 100 may receive the error detection trigger information generated at the step S510, and may instruct the error calculation engine 300 to perform the error detecting operation for at least a part of data (S520).

The reporting circuit 130 of the error detection device 100 may transmit reporting information, according to an error detection result information for the error detecting operation performed at the step S520, to a target device (S530). An example of the target device and an example of the operation of the target device according to the reporting information may be as described above with reference to FIG. 1.

Figure 6:
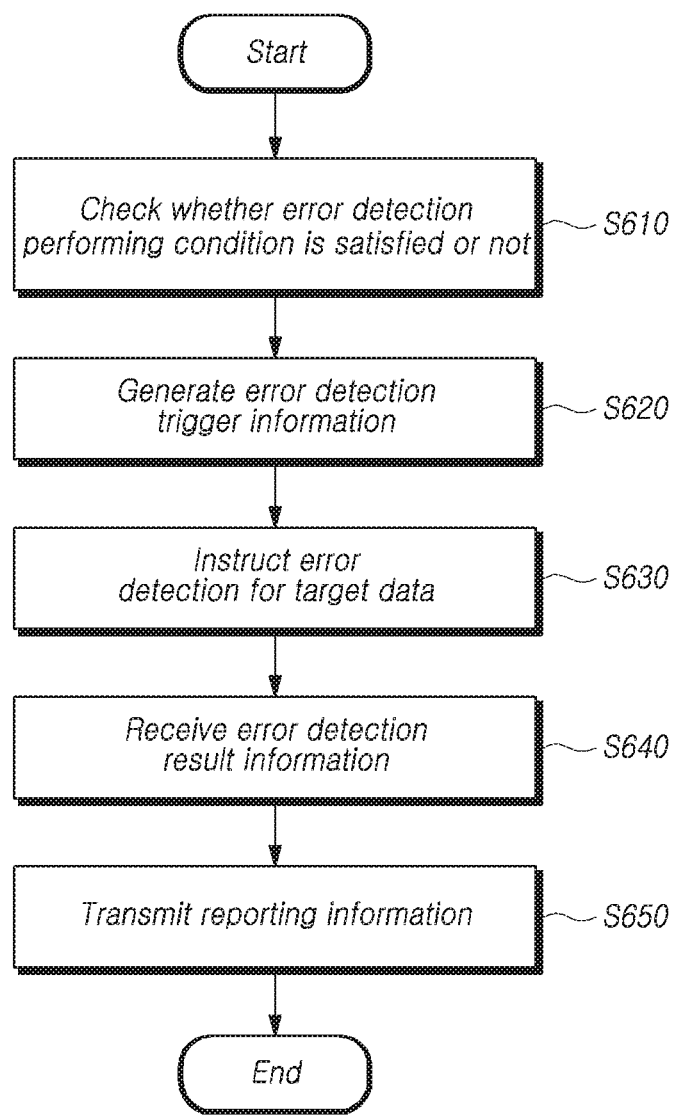
FIG. 6 is a flow chart illustrating an operation of an error detection device in accordance with another embodiment of the disclosure.

FIG. 6 is a flow chart illustrating an operation of the error detection device 100 in accordance with another embodiment of the disclosure.

Referring to FIG. 6, the error detection trigger circuit 110 of the error detection device 100 may check whether a preset error detection performing condition is satisfied or not (S610).

As described above with reference to FIG. 2, for example, the error detection trigger circuit 110 may determine that an error detection performing condition is satisfied, in the case where the mode of the memory device 200 is changed from a retention mode to an active mode. For another example, the error detection trigger circuit 110 may determine that an error detection performing condition is satisfied, at each interval, in the case where the memory device 200 is the retention mode.

An example of an operation for checking whether an error detection performing condition is satisfied or not is described later in detail with reference to FIG. 7.

In the case where it is determined that an error detection performing condition is satisfied, the error detection trigger circuit 110 of the error detection device 100 may generate an error detection trigger information for instructing an error detecting operation for a part or all of data stored in the memory device 200, at each first cycle (S620).

As mentioned, the first cycle at which the error detection trigger information is generated may be determined based on setting information for the error detecting operation on data stored in the memory device 200 or state information of the memory device 200. In detail, warning level information may be determined based on the state information of the memory device 200, and the first cycle may be determined depending on the warning level information and the interval defining a cycle at which the error detecting operation is performed for a part or all of data in the retention mode of the memory device 200.

An example of an operation for determining the warning level information depending on the state information is described later in detail with reference to FIG. 8.

Specific examples of the setting information and the state information may be applied as described above with reference to FIG. 3.

The error detection performing circuit 120 of the error detection device 100 may receive the error detection trigger information generated at the step S620, and may instruct the error calculation engine 300 to perform an error detecting operation for target data selected among data stored in the memory device 200 (S630).

Specific examples of a method and a sequence in which target data is determined are described above with reference to FIG. 4.

The error detection performing circuit 120 of the error detection device 100 may receive an error detection result information for the target data, from the error calculation engine 300 (S640).

Lastly, the reporting circuit 130 of the error detection device 100 may transmit reporting information, according to the error detection result information received from the error detection performing circuit 120, to a target device (S650).

An example of information which may be included in the reporting information and an example of the target device which receives the reporting information are described above with reference to FIG. 1.

Figure 7:
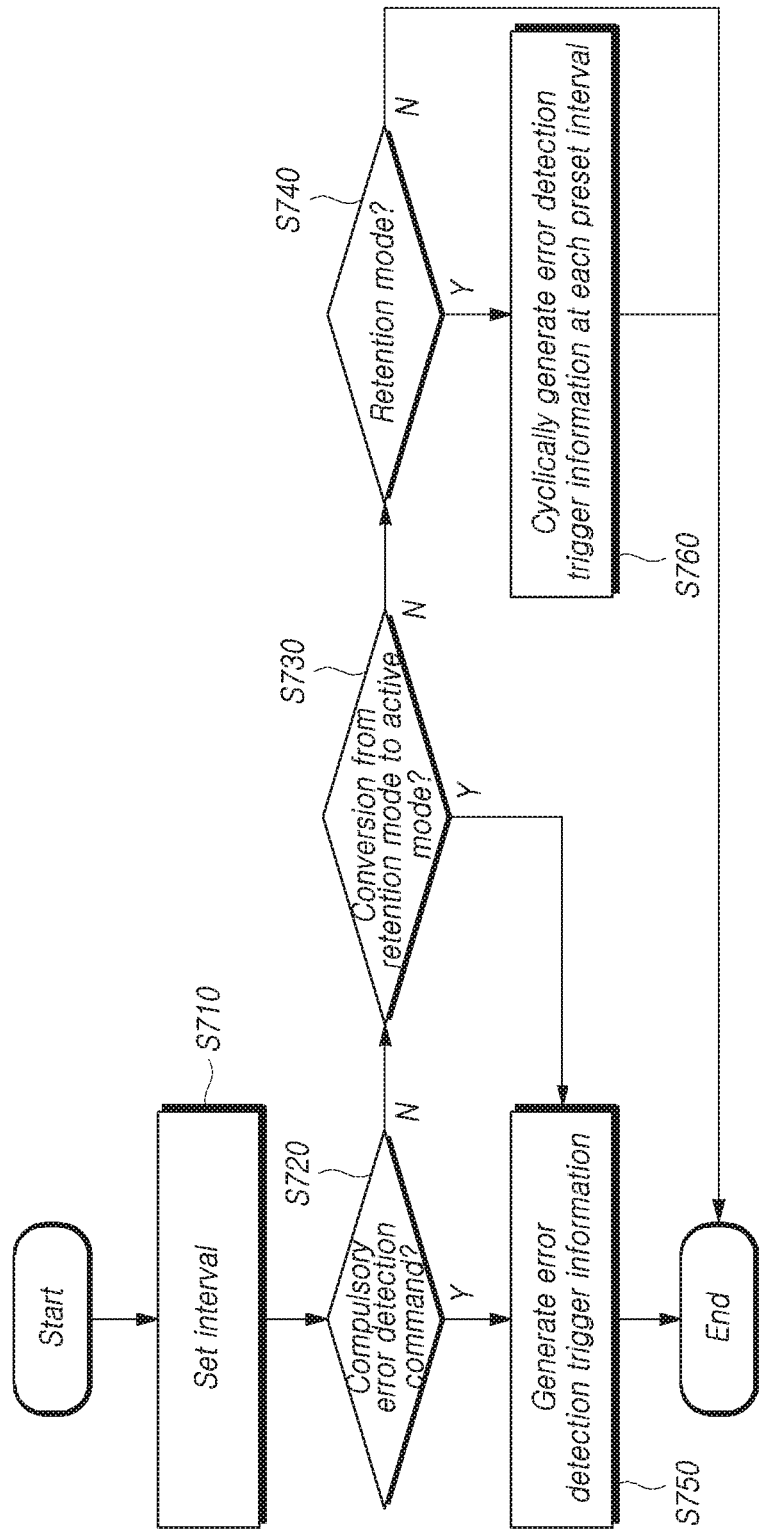
FIG. 7 is a flow chart illustrating an operation of checking whether an error detection performing condition is satisfied, in accordance with an embodiment of the disclosure.

FIG. 7 is a flow chart illustrating an operation of checking whether an error detection performing condition is satisfied, in accordance with an embodiment of the disclosure.

The present operation may be performed by the above-described error detection device 100.

First, an interval at which the error detecting operation is performed may be set (S710). For example, the interval may be set by firmware which drives a controller in which the error detection device 100 and the memory device 200 are mounted.

In order to check whether an error detection performing condition is satisfied or not, first, the error detection trigger circuit 110 may determine whether a compulsory error detection command is set in the setting information which is stored in the setting information storage circuit 111 (S720).

In the case where the compulsory error detection command is set (S720-Y), the error detection trigger circuit 110 may immediately determine that an error detection performing condition is satisfied, regardless of a mode of the memory device 200, and may generate the error detection trigger information (S750).

Conversely, in the case where the compulsory error detection command is not set (S720-N), the error detection trigger circuit 110 may determine whether the mode of the memory device 200 is changed from a retention mode to an active mode (S730).

In the case where the mode of the memory device 200 is changed from the retention mode to the active mode (S730-Y), the above-described step S750 may be performed in the same manner.

Conversely, in the case where the mode of the memory device 200 is not changed from the retention mode to the active mode (S730-N), the error detection trigger circuit 110 of the error detection device 100 may determine whether the memory device 200 is in the retention mode (S740).

In the case where the memory device 200 is in the retention mode (S740-Y), the error detection trigger circuit 110 may cyclically generate the error detection trigger information based on each interval that is set at the step S710 (S760). In this case, the memory device 200 may wake up from the retention mode and enter the active mode.

Figure 8:
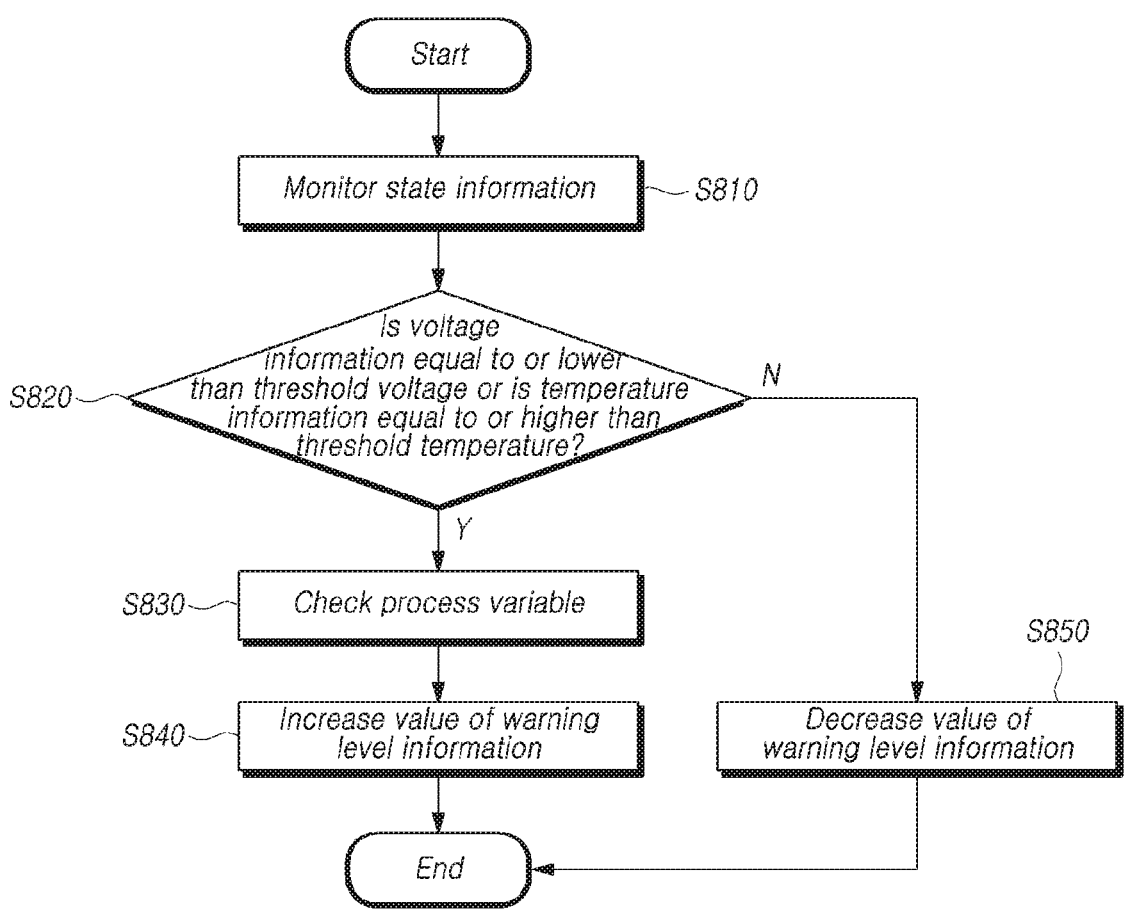
FIG. 8 is a flow chart illustrating an operation of determining a warning level information depending on a state information in accordance with an embodiment of the disclosure.

FIG. 8 is a flow chart illustrating an operation of determining a warning level information depending on a state information in accordance with an embodiment of the disclosure.

The present operation may be performed by the state information monitoring circuit 112 in the error detection trigger circuit 110 of the error detection device 100.

Referring to FIG. 8, first, the state information monitoring circuit 112 may monitor the state information of the memory device 200 (S810).

As described above, the state information of the memory device 200 may include one or more of a process variable, temperature information, voltage information and access frequency information.

The state information monitoring circuit 112 may determine warning level information by setting high priorities to the temperature information and the voltage information of the monitored state information.

In detail, the state information monitoring circuit 112 determines whether the voltage information is equal to or lower than a threshold voltage or the temperature information is equal to or higher than a threshold temperature (S820).

In the case where the voltage information exceeds the threshold voltage and the temperature information is lower than the threshold temperature (S820-N), it may be determined that, because power is normally supplied to the memory device 200 and a temperature condition under which the memory device 200 may normally operate is satisfied, the possibility of an abnormality occurring in the memory device 200 is low. Therefore, the state information monitoring circuit 112 may reduce the value of the warning level information, thereby cant oiling the error detecting operation to be performed slowly (S850).

Conversely, in the case where the voltage information is equal to or lower than the threshold voltage and the temperature information is equal to or higher than the threshold temperature (S820-Y), it may be determined that the possibility of an abnormality occurring in the memory device 200 is high.

The state information monitoring circuit 112 may additionally check the process variable (S830) such that the value of the process variable is reflected in determining the warning level information.

The state information monitoring circuit 112 may increase the warning level information based on the voltage information, the temperature information and a factor for a processor, thereby controlling the error detecting operation to be performed quickly (S840).

According to embodiments of the disclosure, it is possible to detect an error of data stored in a memory device, regardless of whether the data stored in the memory device in a storage device is actually used or not. This is because an error detecting operation for data stored in the memory device is performed before the data stored in the memory device is actually used (e.g., when the memory device is changed from a retention mode to an active mode).

Thus, advantages may be provided in that the integrity of the data stored in the memory device may be ensured by itself, and, if an error occurs in such data the error may be detected or corrected as quickly as possible. As a consequence, it is possible to prevent a situation in which multiple errors occur and accumulate in the memory device and thus are not properly detected and due to this fact, the entire storage device malfunctions.

Therefore, through embodiments of the disclosure, advantages may be provided in that the possibility of an additional error occurring in the memory device may be minimized in a situation where another type of error is highly likely to occur (e.g., supplied voltage drops due to a power issue or temperature rises due to heat generation) and thereby the stability of an entire system may be maximized.

As a result, embodiments of the disclosure may be applied to secure stability in a system and various applications where fault tolerance is required.

Figure 9:
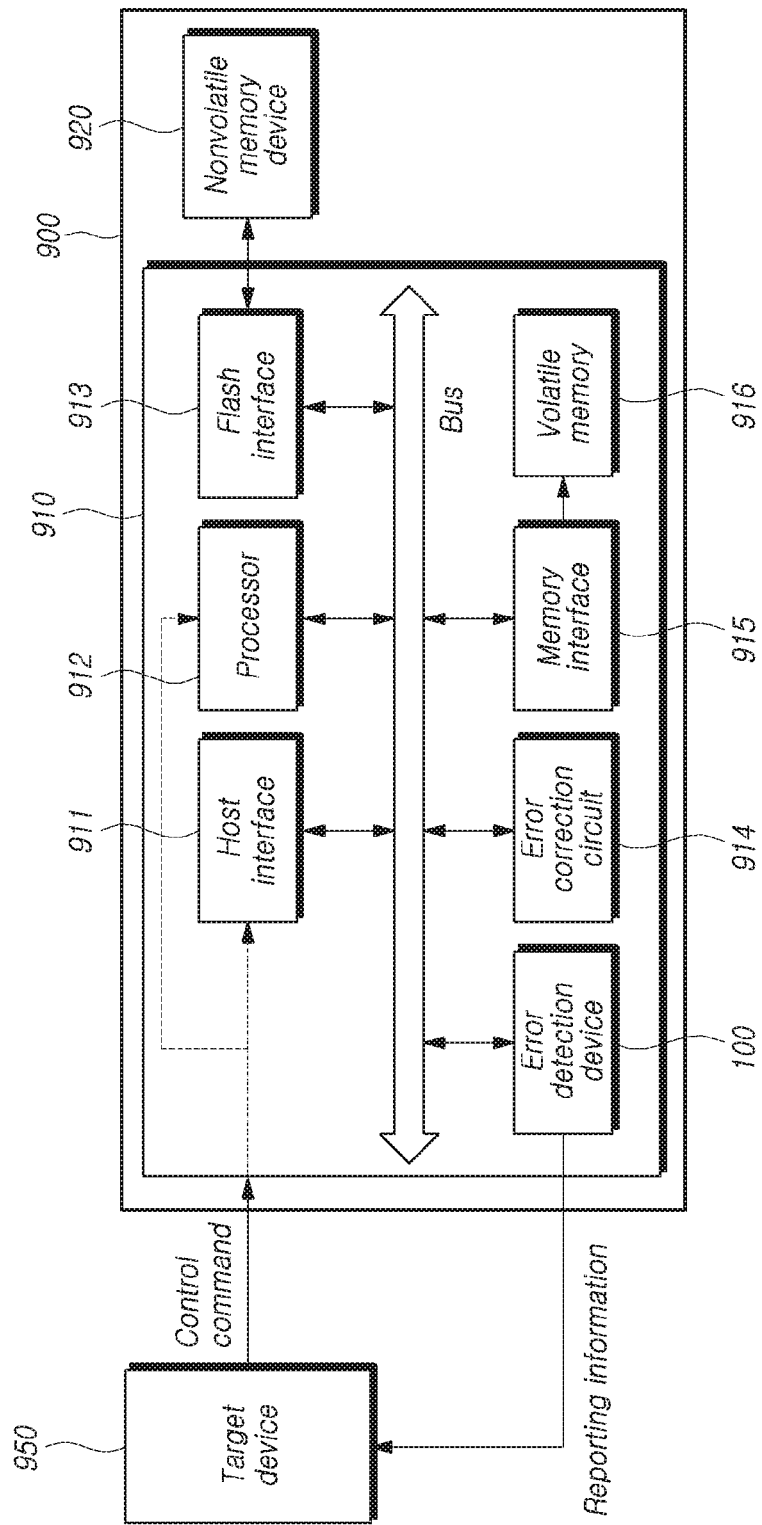
FIG. 9 is a diagram illustrating a storage device in accordance with an embodiment of the disclosure.

FIG. 9 is a diagram illustrating a storage device 900 to which an embodiment of the disclosure is applied.

A controller 910 may receive a request from a host, and may control the operation of a nonvolatile memory device 920 based on the received request. For example, the controller 910 may control write, read, erase and background operations for the nonvolatile memory device 920. For example, the background operation may be a garbage collection (GC) operation, a wear leveling (WL) operation, a bad block management (BBM) operation, or the like.

In addition to the error detection device 100 described above, the controller 910 may further include a host interface 911, a processor 912, a flash interface 913, an error correction circuit 914, a memory interface 915, a volatile memory 916 and a bus.

The host interface 911 provides an interface for communication with an external host.

The flash interface 913 provides an interface for communication with the nonvolatile memory device 920.

The error correction circuit 914 may perform error correction for data to be stored in a memory. The EDC/ECC engine 300 described above with reference to FIG. 1 may be realized by the error correction circuit 914.

The volatile memory 916 may store program codes which are necessary to drive the controller 910, commands or data, and may be an SRAM or a DRAM.

In the case where there is no DRAM in the controller 910, the volatile memory 916 may store a map table for managing the nonvolatile memory device 920. Since the size of data which may be stored in the volatile memory 916 is limited, the volatile memory 916 cannot load the entire map table for managing the nonvolatile memory device 920.

Therefore, the volatile memory 916 caches a part of the map table, and repeatedly loads/unloads map table data stored in the nonvolatile memory device 920, when necessary.

In an embodiment of the disclosure, the memory device 200 described above with reference to FIG. 1 may be realized by the volatile memory 916.

If an error occurs in data stored in the volatile memory 916, the controller 910 may operate abnormally, and a problem may be caused in a read/write operation for the nonvolatile memory device 920. In this case, the controller 910 may generate reporting information and transmit the reporting information to a target device 950, and the target device 950 may control the state of the controller 910 based on the received reporting information.

For example, the target device 950 may reboot the controller 910 when it is determined that an error indicated by the reporting information exerts a critical influence on the data stored in the nonvolatile memory device 920. If the controller 910 is rebooted, entire data stored in the volatile memory 916 is invalidated.

The memory interface 915 may be used as a buffer in which a working memory, a cache memory or a buffer memory to be used by the processor 912 is disposed. The memory interface 915 may include therein an SRAM or a DRAM.

The bus may be configured to provide channels among the components of the controller 910.

The processor 912 may control general operations of the controller 910, and may perform a logic calculation. The processor 912 may communicate with the external host through the host interface 911, and may communicate with the nonvolatile memory device 920 through the flash interface 913. The processor 912 may detect an error of the data stored in the nonvolatile memory device 920 and may correct the error, if necessary, through the error correction circuit 914. The processor 912 may perform a data read/write operation for the volatile memory 916, by using the working memory, the cache memory or the buffer memory through the memory interface 915.

The processor 912 may perform the function of a flash translation layer (FTL). The processor 912 may convert a logical block address (LBA) provided by the host, into a physical block address (PBA), through the flash translation layer FTL. The flash translation layer (FTL) may receive the logical block address (LBA) and convert it into the physical block address (PBA), by using the mapping table. There are various address mapping methods of the flash translation layer that may be used, depending on a mapping unit. Representative address mapping methods include a page mapping method, a block mapping method and a hybrid mapping method.

The processor 912 is configured to randomize data received from the host. For example, the processor 912 may randomize the data received from the host, by using a randomizing seed. Randomized data as data to be stored is provided to the memory device and is programmed in a memory cell array.

The processor 912 is configured to derandomize data received from the memory device, in a read operation. For example, the processor 912 may derandomize data received from the memory device, by using a derandomizing seed. Derandomized data may be outputted to the host.

In an embodiment of the disclosure, the processor 912 may perform a calculation that is necessary for the operation of the error detection device 100 described above with reference to FIG. 2. For example, the processor 912 may perform a calculation of driving a firmware which operates to detect an error of the data stored in the memory device. The corresponding firmware may be stored in a specific block (a firmware block) of the nonvolatile memory device 920, and may be loaded from the corresponding block when the controller 910 is booted.

A specific example in which the error detection device 100 operates in the storage device 900 is described below.

As described above, the error detection device 100 may cyclically generate an error detection trigger information in the case where an error detection performing condition that is set in advance is satisfied, and may perform an error detecting operation for data stored in the memory device 200 which is realized through the volatile memory 916, depending on the generated error detection trigger information. The error detection device 100 may obtain error detection result information (information on whether an error has occurred or not or the number of bits in which an error has occurred), by using the EDC/ECC engine 300 which is realized through the error correction circuit 914.

The error detection device 100 may generate reporting information based on the error detection result information, and may transmit the reporting information to the target device 950. The reporting information may include the address information of data where an error has occurred and information on the error (e.g., the number of error bits/whether or not the error is correctable/the risk level of the error).

While a scheme in which the error detection device 100 directly transmits the reporting information to the target device 950 was described with reference to FIG. 9 as an example, in the case where the target device 950 is a host, the reporting information may be transmitted to the target device 950 through the host interface 911.

The target device 950 may receive the reporting information from the error detection device 100, and may control the operation of the storage device 900 depending on the received reporting information.

An example is where an error indicated by the received reporting information is correctable (correctable through 1-bit ECC as a 1-bit error) or the error may be corrected by initializing only a region where the error has occurred in the memory device) (e.g., a region where a temporary variable is stored).

The target device 950 may transfer a control command instructing that a log indicating that an error has occurred be stored in the nonvolatile memory device 920, through the host interface 911 of the controller 910. The controller 910 may receive the command transferred from the target device 950, perform a calculation of generating an error log through the processor 912, and store the error log in the nonvolatile memory device 920 through the flash interface 913.

Thus, the storage device 900 may detect, as quickly as possible, an error which has occurred in data stored in the memory device, and may perform an operation for blocking in advance the possibility of an error to subsequently occur in the data stored in the memory device, based on the error log.

Another example may be the case where an error indicated by the received reporting information is uncorrectable (for example, errors occurring in two bits which exceeds the correction capability of the 1-bit ECC scheme of error correction circuit 914), and a region where the error has occurred in the memory device is a region which is related with a core operation of the storage device 900 (e.g., a region where a map table to be used in converting a logical page address and a physical page address is stored). In this case, it is necessary to quickly reset the storage device 900 in order to prevent a problem from being caused due to a malfunction of the storage device 900.

Hence, the target device 950 may transfer a reset command for the storage device 900, to the storage device 900. In this regard, instead of causing the reset command to be transferred to the processor 912 through the host interface 911, the target device 950 may input a reset signal directly to the processor 912 such that the storage device 900 may be reset.

If the storage device 900 is reset, all operations of the storage device 900 are stopped, all data stored in the volatile memory 916 is initialized, and the firmware stored in the nonvolatile memory device 920 is loaded. Since all data stored in the volatile memory 916 is initialized, the possibility of the storage device 900 to subsequently malfunction due to an error of data stored in the volatile memory 916 may be quickly blocked, and data stored in the nonvolatile memory device 920 may be normally conserved.

Figure 10:
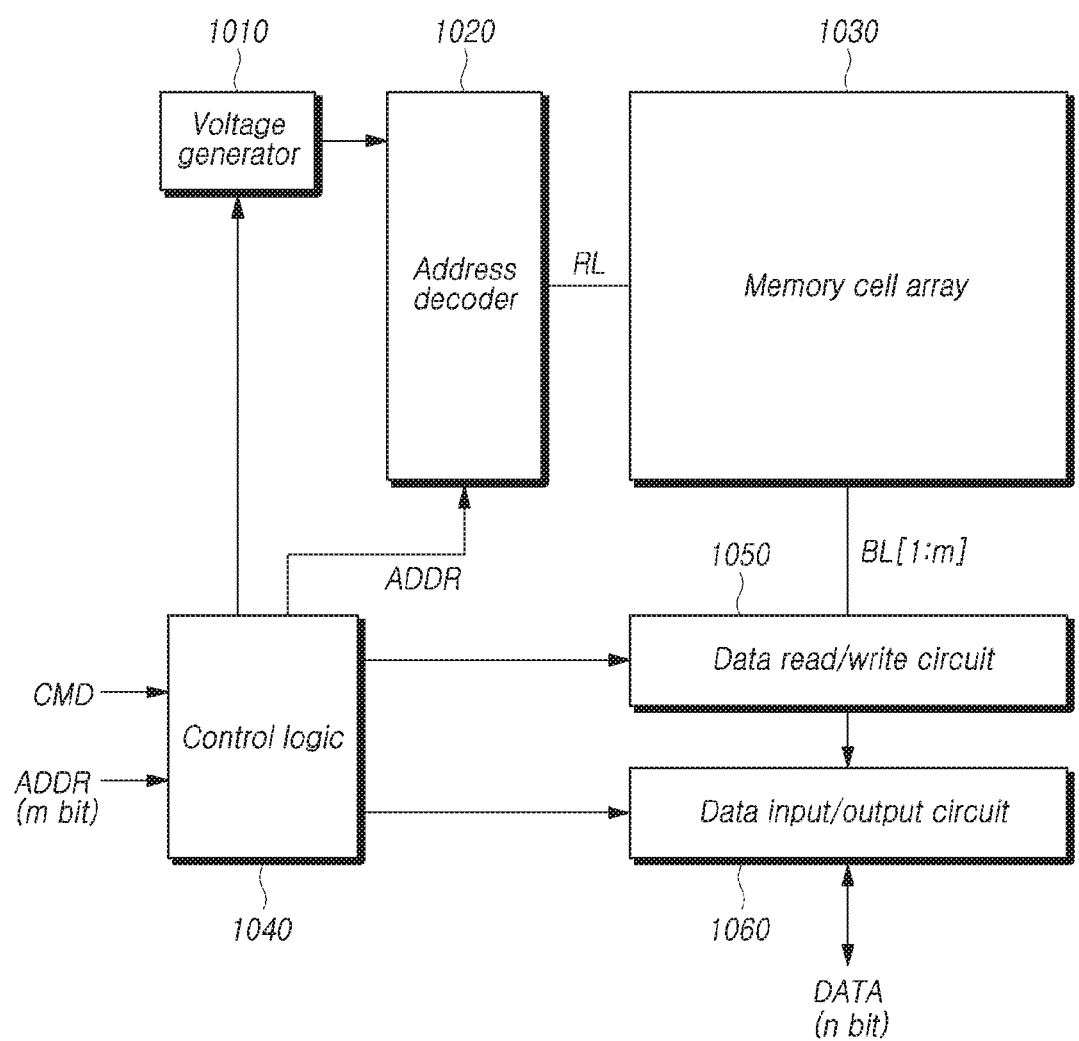
FIG. 10 is a diagram illustrating structure of a nonvolatile memory device, such as that of FIG. 9.

FIG. 10 is a diagram illustrating structure of a nonvolatile memory device of FIG. 9.

A nonvolatile memory device 1000 may include a voltage generator 1010, an address decoder 1020, a memory cell array 1030, a control logic 1040, a data read/write circuit 1050 and a data input/output circuit 1060.

The memory cell array 1030 includes a plurality of memory blocks, which are coupled to the address decoder 1020 through row lines RL. The plurality of memory blocks are coupled to the data read/write circuit 1050 through bit lines BL[1:m].

Each of the plurality of memory blocks includes a plurality of memory cells. The plurality of memory cells may be nonvolatile memory cells. Among the plurality of memory cells, memory cells which are coupled to the same word line are defined as one page. That is to say, the memory cell array 1030 may be configured by a plurality of pages.

In an embodiment, each of the plurality of memory blocks in the memory cell array 1030 may include a plurality of dummy cells. At least one of the dummy cells may be coupled in series between a drain select transistor and memory cells and between a source select transistor and memory cells.

Each of the memory cells included in the memory cell array 1030 may be configured by a single level cell (SLC) storing one data bit, a multi-level cell (MLC) storing two data bits, a triple level cell (TLC) storing three data bits or a quad level cell (QLC) storing four data bits.

The address decoder 1020 is coupled to the memory cell array 1030 through the row lines RL. The row lines RL may include drain select lines, word lines, source select lines and a common source line. In an embodiment, the word lines may include normal word lines and dummy word lines. In an embodiment, the row lines RL may further include a pipe select line.

The address decoder 1020 is configured to operate in response to the control of the control logic 1040. The address decoder 1020 receives an address ADDR from the control logic 1040.

The address decoder 1020 is configured to decode a block address in the received address ADDR. The address decoder 1020 selects at least one memory block among the memory blocks depending on the decoded block address. The address decoder 1020 is configured to decode a row address in the received address ADDR. The address decoder 1020 may apply voltages provided from the voltage generator 1010, to at least one word line WL, depending on the decoded row address, and thereby, may select at least one word line in the selected memory block.

In a program operation, the address decoder 1020 may apply a program voltage to a selected word line and may apply a pass voltage of a level lower than the program voltage to unselected word lines. In a program verify operation, the address decoder 1020 may apply a verify voltage to the selected word line and may apply a verify pass voltage higher than the verify voltage to the unselected word lines.

In a read operation, the address decoder 1020 may apply a read voltage to a selected word line and may apply a pass voltage higher than the read voltage to unselected word lines.

In an embodiment, an erase operation of the nonvolatile memory device 1000 is performed on a memory block basis. The address ADDR inputted to the nonvolatile memory device 1000 in the erase operation includes a block address. The address decoder 1020 may decode the block address, and may select one memory block depending on the decoded block address. In the erase operation, the address decoder 1020 may apply a ground voltage to word lines which are coupled to a selected memory block.

In an embodiment, the address decoder 1020 may be configured to decode a column address in the received address ADDR. The decoded column address (DCA) may be transferred to the data read/write circuit 1050. For instance, the address decoder 1020 may include components such as a row decoder, a column decoder and an address buffer.

The voltage generator 1010 is configured to generate a plurality of voltages by using an external power supply voltage supplied to the nonvolatile memory device 1000. The voltage generator 1010 operates in response to the control of the control logic 1040.

In an embodiment, the voltage generator 1010 may generate an internal power supply voltage by regulating the external power supply voltage. The internal power supply voltage generated by the voltage generator 1010 is used as an operating voltage of the nonvolatile memory device 1000.

As an embodiment, the voltage generator 1010 may generate a plurality of voltages by using the external power supply voltage or the internal power supply voltage. The voltage generator 1010 may be configured to generate various voltages required in the nonvolatile memory device 1000. For example, the voltage generator 1010 may generate a plurality of program voltages, a plurality of pass voltages, a plurality of selected read voltages and a plurality of unselected read voltages.

For example, the voltage generator 1010 may include a plurality of pumping capacitors which receive the internal power supply voltage, and may generate the plurality of voltages by selectively activating the plurality of pumping capacitors in response to the control of the control logic 1040.

The plurality of generated voltages may be supplied to the memory cell array 1030 by the address decoder 1020.

The data read/write circuit 1050 may include first to m^th page buffers. The first to mth page buffers are coupled to the memory cell array 1030 through the first to mth bit lines BL[1:m], respectively. The first to mth page buffers operate in response to the control of the control logic 1040.

The first to mth page buffers perform data communication with the data input/output circuit 1060. In a program operation, the first to mth page buffers receive data DATA to be stored through the data input/output circuit 1060.

In a program operation, the first to mth page buffers may transfer the data DATA to be stored, that is, the data DATA received through the data input/output circuit 1060, to selected memory cells through bit lines BL, when a program pulse is applied to a selected word line. The memory cells of a selected page are programmed according to the transferred data DATA. A memory cell coupled with a bit line to which a program permission voltage (for example, a ground voltage) is applied may have an increased threshold voltage. The threshold voltage of a memory cell coupled with a bit line to which a program inhibition voltage (for example, a power supply voltage) is applied may be retained. In a program verify operation, the first to m^th page buffers read page data through the bit lines BL from the selected memory cells.

In a read operation, the data read/write circuit 1050 reads data DATA through bit lines BL from the memory cells of a selected page, and outputs the read data DATA to the data input/output circuit 1060.

In an erase operation, the data read/write circuit 1050 may float the bit lines BL. As an embodiment, the data read/write circuit 1050 may include a column select circuit.

The data input/output circuit 1060 is coupled to the first to mth page buffers through data lines. The data input/output circuit 1060 operates in response to the control of the control logic 1040.

The data input/output circuit 1060 may include a plurality of input/output buffers (not illustrated) which receive data to be inputted. In a program operation, the data input/output circuit 1060 receives data DATA to be stored, from an external controller (not illustrated). In a read operation, the data input/output circuit 1060 outputs data transferred from the first to mth page buffers included in the data read/write circuit 1050, to the external controller.

The control logic 1040 may be coupled to the address decoder 1020, the voltage generator 1010, the data read/write circuit 1050 and the data input/output circuit 1060. The control logic 1040 may be configured to control general operations of the nonvolatile memory device 1000. The control logic 1040 may operate in response to a command CMD transferred from a target device.

Figure 11:
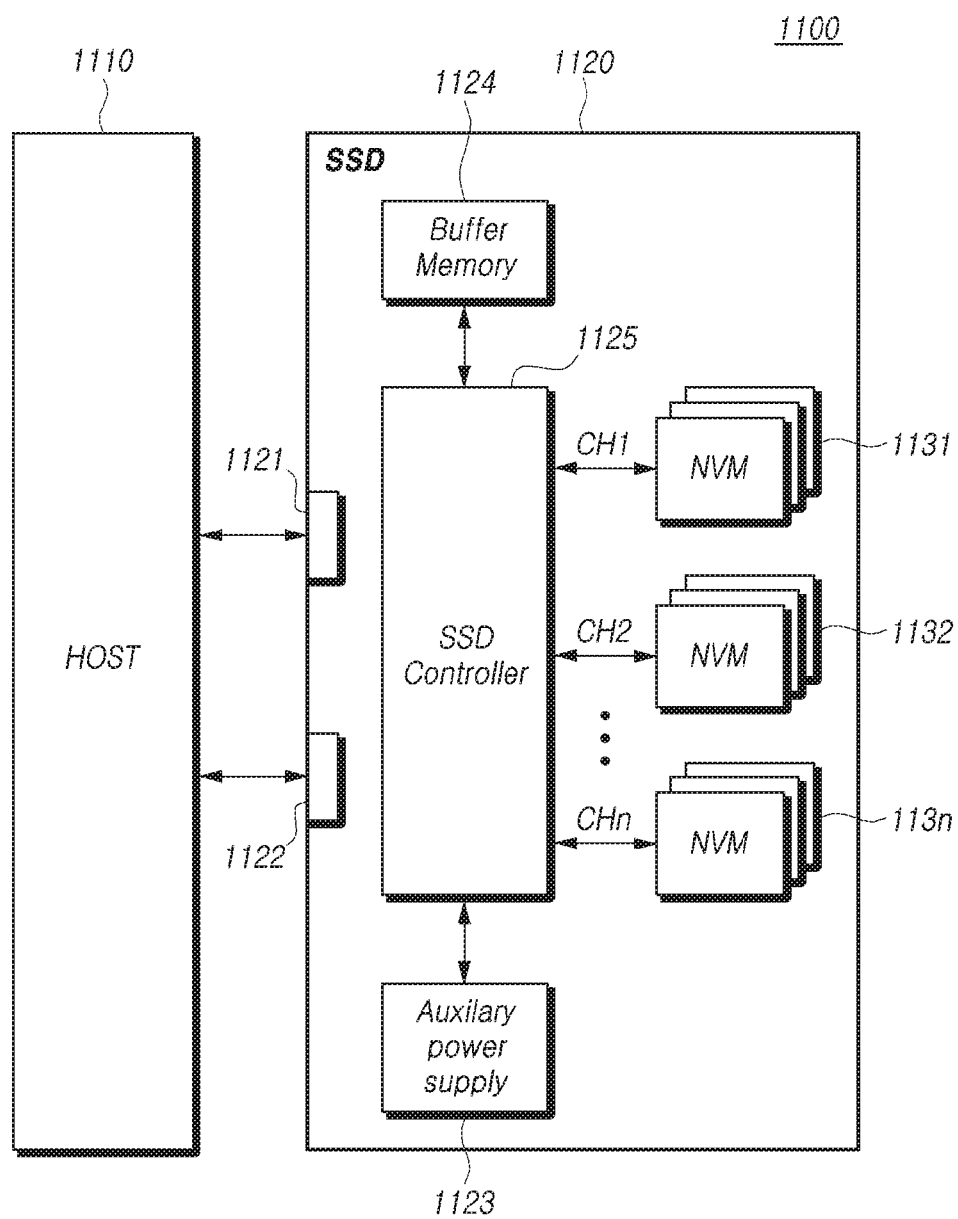
FIG. 11 is a block diagram illustrating an SSD system in accordance with an embodiment of the disclosure.

FIG. 11 is a block diagram illustrating an SSD system to which an embodiment of the disclosure is applied.

An SSD system 1100 includes a host 1110 and an SSD 1120. The SSD 1120 exchanges a signal (SIG) with the host 1110 through a signal connector 1121, and receives a power (PWR) through a power connector 1122. The SSD 1120 includes an SSD controller 1125, a plurality of flash memories 1131 to 113n, an auxiliary power supply 1123 and a buffer memory 1124.

In an embodiment, the SSD controller 1125 may perform the function of the aforementioned error detection device 100.

The SSD controller 1125 may control the plurality of flash memories 1131 to 113n in response to the signal (SIG) received from the host 1110. For instance, the signal (SIG) may be signals based on the interface of the host 1110 and the SSD 1120. For example, the signal (SIG) may be defined by at least one among interfaces such as USB (universal serial bus), MMC (multimedia card), eMMC (embedded MMC), PCI (peripheral component interconnection), PCI-e or PCIe (PCI-express), ATA (Advanced Technology Attachment), Serial-ATA, Parallel-ATA, SCSI (small computer small interface), ESDI (enhanced small disk interface), IDE (Integrated Drive Electronics), Firewire, UFS (universal flash storage), VViFi, Bluetooth and NVMe.

The auxiliary power supply 1123 is coupled with the host 1110 through the power connector 1122. The auxiliary power supply 1123 may receive and be charged with the power PWR from the host 1110. The auxiliary power supply 1123 may provide the power of the SSD 1120 when power supply from the host 1110 is not smooth. The auxiliary power supply 1123 may be disposed within the SSD 1120 or may be external to the SSD 1120. For example, the auxiliary power supply 1123 may be positioned on a main board, and may provide auxiliary power to the SSD 1120.

The buffer memory 1124 may serve the SSD 1120. For example, the buffer memory 1124 may temporarily store data received from the host 1110 or data received from the plurality of flash memories 1131 to 113n, or may temporarily store the metadata (for example, a mapping table) of the flash memories 1131 to 113n. The buffer memory 1124 may include a volatile memory such as a DRAM, an SDRAM, a DDR SDRAM, an LPDDR SDRAM and a GRAM or a nonvolatile memory such as an FRAM, an ReRAM, an STT-MRAM and a PRAM.

For instance, each of the nonvolatile memories 1131 to 113n may be the nonvolatile memory device described above with reference to FIG. 10.

Figure 12:
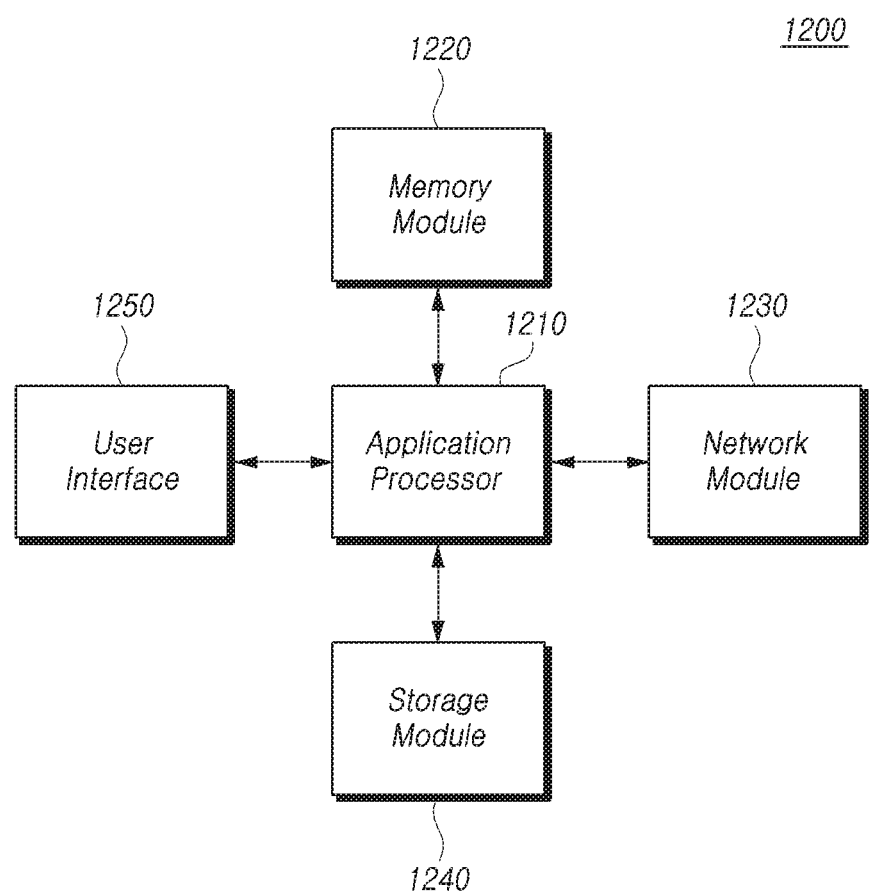
FIG. 12 is a block diagram illustrating a user system in accordance with an embodiment of the disclosure.

FIG. 12 is a block diagram illustrating a user system to which an embodiment of the disclosure is applied.

A user system 1200 includes an application processor 1210, a memory module 1220, a network module 1230, a storage module 1240 and a user interface 1250.

The application processor 1210 may drive components, an operating system (OS) or a user program included in the user system 1200. For instance, the application processor 1210 may include controllers, interfaces, a graphic engine and so forth which control the components included in the user system 1200. The application processor 1210 may be provided as a system-on-chip (SoC).

The memory module 1220 may operate as a main memory, a working memory, a buffer memory or a cache memory of the user system 1200. The memory module 1220 may include a volatile random access memory such as a DRAM, an SDRAM, a DDR SDRAM, a DDR2 SDRAM, a DDR3 SDRAM, an LPDDR SDRAM, an LPDDR2 SDRAM and an LPDDR3 SDRAM or a nonvolatile random access memory such as a PRAM, an ReRAM, an MRAM and an FRAM. For instance, the application processor 1210 and the memory module 1220 may be provided as one semiconductor package by being packaged on the basis of a POP (package-on-package).

The network module 1230 may perform communication with target devices. For instance, the network module 1230 may support wireless communication such as CDMA (code division multiple access), GSM (global system for mobile communication), WCDMA (wideband CDMA), CDMA-2000, TDMA (time division multiple access), LTE (long term evolution), Wimax, WLAN, UWB, Bluetooth and WI-DI. For instance, the network module 1230 may be included in the application processor 1210.

The storage module 1240 may store data. For example, the storage module 1240 may store data received from the application processor 1210. Otherwise, the storage module 1240 may transmit data stored therein to the application processor 1210. For instance, the storage module 1240 may be realized by a nonvolatile semiconductor memory device such as a PRAM (phase-change RAM), an MRAM (magnetic RAM), an RRAM (resistive RAM), a NAND flash, a NOR flash and a NAND flash of a three-dimensional structure. For instance, the storage module 1240 may be provided as a removable storage medium (removable drive) such as a memory card of the user system 1200 and an external drive.

For instance, the storage module 1240 may include a plurality of nonvolatile memory devices, and the plurality of nonvolatile memory devices may be the nonvolatile memory device 1000 described above with reference to FIG. 10.

The user interface 1250 may include interfaces for inputting data or commands to the application processor 1210 or for outputting data to a target device. For instance, the user interface 1250 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 1250 may include user output interfaces such as an LCD (liquid crystal display), an OLED (organic light emitting diode) display device, an AMOLED (active matrix OLED) display device, an LED, a speaker and a monitor.

It will be understood by those skilled in the art that the technical configurations of the disclosure described above can be embodied in other specific forms without departing from the spirit and scope of the disclosure. Therefore, it should be understood that the embodiments described above are to be considered in all respects as exemplary, not restrictive. The scope of the invention is indicated by the appended claims and their equivalents, rather than the foregoing description. Moreover, the invention encompasses all changes or modifications that fall within the claims and their equivalents.

In the above described embodiments of the disclosure, steps may be selectively performed or omitted. Moreover, the steps do not necessarily have to be performed in the order depicted.

The embodiments of the disclosure are presented to help those skilled in the art understand the disclosure. Those skilled in the art will recognize that various modifications and changes can be made thereto without departing from the spirit and scope of the disclosure.

What is claimed is:

1. A device for detecting an error of data stored in a memory device, the device comprising:
    an error detection trigger circuit configured to transmit error detection trigger information for instructing an error detecting operation for at least part of the data, at each first cycle, in the case where an error detection performing condition is satisfied;
    an error detection performing circuit configured to receive the error detection trigger information, instruct an error calculation engine to perform an error detecting operation for part or all of the data, and receive an error detection result information from the error calculation engine; and
    a reporting circuit configured to transmit reporting information, depending on the error detection result information, to a target device,
    wherein the error detection performing condition is satisfied in the case where a compulsory error detection command is provided to the error detection trigger circuit, in the case where a mode of the memory device is changed from a retention mode to an active mode, in the case where the memory device enters the retention mode or in the case where a set time elapses after the memory device enters the retention mode.

2. The device according to claim 1, wherein the error detection trigger circuit transmits the error detection trigger information at each first cycle, based on setting information for detecting an error of the data or state information representing a state of the memory device.

3. The device according to claim 2,
    wherein the error detection trigger circuit comprises:
    a setting information storage circuit configured to store the setting information;
    a state information monitoring circuit configured to monitor the state information to generate the state information; and
    a trigger generation circuit configured to transmit the error detection trigger information at each first cycle, based on the setting information or the state information,
    wherein the first cycle is determined based on the setting information or the state information.

4. The device according to claim 3,
    wherein the state information comprises at least one of a process variable, temperature information, voltage information and access frequency information for the memory device,
    wherein the state information monitoring circuit generates warning level information which is set based on the state information, and
    wherein the trigger generation circuit determines the first cycle based on the warning level information.

5. The device according to claim 4,
wherein the state information comprises a process variable, temperature information and voltage information for the memory device,
wherein, in the case where the temperature information is equal to or higher than a threshold temperature or the voltage information is equal to or lower than a threshold voltage, the state information monitoring circuit increases a value of the warning level information based on the process variable, and
wherein, in the case where the temperature information is lower than the threshold temperature or the voltage information exceeds the threshold voltage, the state information monitoring circuit decreases the value of the warning level information based on the process variable.

6. The device according to claim 4, wherein the setting information includes an interval that defines a cycle at which the error detecting operation is performed while the memory device is in a retention mode.

7. The device according to claim 6,
wherein a mode of the memory device is changed from the retention mode to an active mode to perform the error detecting operation, and
wherein the mode of the memory device is returns to the retention mode when the error detecting operation is completed in the active mode.

8. The device according to claim 6, wherein the trigger generation circuit determines the first cycle based on the interval and the warning level information.

9. The device according to claim 1, wherein the error detection performing circuit comprises:
a target data determination circuit configured to select target data for the error detecting operation within the data; and
an error detection instruction circuit configured to instruct an error calculation engine to perform the error detecting operation for the target data, and receive the error detection result information for the error detecting operation from the error calculation engine.

10. The device according to claim 1, wherein the reporting information comprises at least one of information on whether an error has occurred or not, information on an address where an error has occurred and information on whether a number of error bits is equal to or lower than a limit representing a maximum number of correctable error bits.

11. A method for detecting an error of data stored in a memory device, the method comprising:
generating an error detection trigger information for instructing an error detecting operation for at least part of the data, at each first cycle, in the case where an error detection performing condition is satisfied;
receiving the error detection trigger information, and performing the error detecting operation; and
transmitting reporting information, depending on an error detection result information for the error detecting operation, to a target device,
wherein the error detection performing condition is satisfied in the case where a compulsory error detection command is provided to the error detection trigger circuit, in the case where a mode of the memory device is changed from a retention mode to an active mode, in the case where the memory device enters the retention mode or in the case where a set time elapses after the memory device enters the retention mode.

12. The method according to claim 11, wherein the error detection trigger information is determined based on setting information for detecting an error of the data or state information of the memory device.

13. The method according to claim 12,
wherein the state information comprises at least one of a process variable, temperature information, voltage information and access frequency information for the memory device, and
wherein the first cycle is determined based on warning level information which is set based on the state information.

14. The method according to claim 13,
wherein, in the case where the temperature information is equal to or higher than a threshold temperature or the voltage information is equal to or lower than a threshold voltage, the generating of the error detection trigger information at each first cycle increases a value of the warning level information based on the process variable, and
wherein, in the case where the temperature information is lower than the threshold temperature or the voltage information exceeds the threshold voltage, the generating of the error detection trigger information at each first cycle decreases the value of the warning level information based on the process variable.

15. The method according to claim 12, wherein the setting information comprises an interval that defines a cycle at which the error detecting operation is performed while the memory device is in a retention mode.

16. The method according to claim 15, wherein the first cycle is determined based on the interval and warning level information.

17. The method according to claim 11,
wherein a mode of the memory device is changed from a retention mode to an active mode to perform the error detecting operation, and
wherein the mode of the memory device returns to the retention mode when the error detecting operation is completed in the active mode.

18. The method according to claim 11, wherein the performing of the error detecting operation includes instructing an error calculation engine to perform the error detecting operation, and receiving an error detection result information for the error detecting operation from the error calculation engine.

19. A memory system comprising:
a memory device configured to store data;
an error detection circuit configured to perform an error detection operation on at least part of the data; and
a processor configured to control the error detection circuit to perform the error detection operation and to report a result of the error detection operation to a host,
wherein the processor controls the error detection circuit to perform the error detection operation when a compulsory error detection command is provided to the error detection circuit, when a mode of the memory device is changed from a retention mode to an active mode, when the memory device enters the retention mode or when a set time elapses after the memory device enters the retention mode, and
wherein the processor controls the error detection circuit to further perform the error detection operation at each detection cycle varying with respect to a default cycle according to a state of the memory device.

* * * * *